(12) United States Patent
Lovley, II et al.

(10) Patent No.: US 8,746,267 B2
(45) Date of Patent: Jun. 10, 2014

(54) HEIGHT-ADJUSTABLE CANOPY LEG

(71) Applicant: Bravo Sports, Santa Fe Springs, CA (US)

(72) Inventors: Jack B. Lovley, II, Lake Forest, CA (US); Mark Groenhuyzen, Huntington Beach, CA (US); Jospeh Klingl, Los Angeles, CA (US)

(73) Assignee: Bravo Sports, Santa Fe Springs, CA (US)

( * ) Notice: Subject to any disclaimer, the term of this patent is extended or adjusted under 35 U.S.C. 154(b) by 0 days.

(21) Appl. No.: 13/929,667

(22) Filed: Jun. 27, 2013

(65) Prior Publication Data

US 2014/0090681 A1    Apr. 3, 2014

Related U.S. Application Data

(60) Provisional application No. 61/708,520, filed on Oct. 1, 2012.

(51) Int. Cl.
   *E04H 15/32* (2006.01)
   *E04H 15/46* (2006.01)
   *E04H 15/60* (2006.01)

(52) U.S. Cl.
   USPC .................. 135/120.2; 135/114; 135/140

(58) Field of Classification Search
   USPC .......... 135/140, 114, 120.1, 120.2; 403/109.5
   See application file for complete search history.

(56) References Cited

U.S. PATENT DOCUMENTS

| | | | |
|---|---|---|---|
| 1,238,646 A | 8/1917 | Dennis | |
| 2,849,249 A | 8/1958 | Fridolph | |
| 3,371,671 A | 3/1968 | Kirkham | |
| 4,029,279 A | 6/1977 | Nakatani | |
| 4,174,900 A | 11/1979 | Ina | |
| 4,596,484 A | 6/1986 | Nakatani | |
| 4,761,092 A | 8/1988 | Nakatani | |
| 4,932,622 A * | 6/1990 | Hayakawa | ................. 248/188.5 |
| 5,154,449 A | 10/1992 | Suei-Long | |
| 5,485,863 A | 1/1996 | Carter | |
| 5,490,533 A | 2/1996 | Carter | |
| 5,593,239 A | 1/1997 | Sallee | |
| 5,632,292 A | 5/1997 | Carter | |

(Continued)

FOREIGN PATENT DOCUMENTS

FR    532 496 A    2/1922

OTHER PUBLICATIONS

International Search Report; Application No. PCT/US2013/062364; Filed Sep. 27, 2013; Mailed Feb. 19, 2014.

*Primary Examiner* — Noah Chandler Hawk

(74) *Attorney, Agent, or Firm* — Knobbe, Martens, Olson & Bear, LLP

(57) ABSTRACT

In some embodiments, a canopy structure includes a plurality of support members, each including a first leg and a second leg telescopically slideable within the first leg to infinitely adjust a height of the canopy structure. The canopy structure can include a plurality of eaves including scissor-jack members moveable between an extended position and a collapsed position. The canopy structure can include a plurality of locking members. The locking members can be coupled to the first legs. The locking members can be adjustable between a locked and an unlocked position. The locking members can be configured to apply a radial inward force received by an area of the second legs when the locking members are in the locked position.

9 Claims, 18 Drawing Sheets

(56) References Cited

U.S. PATENT DOCUMENTS

| | | | |
|---|---|---|---|
| 5,813,425 A | 9/1998 | Carter | |
| 5,934,301 A | 8/1999 | Carter | |
| 6,000,175 A | 12/1999 | Gale et al. | |
| 6,035,877 A | 3/2000 | Losi, Jr. et al. | |
| 6,070,604 A | 6/2000 | Carter | |
| 6,089,247 A | 7/2000 | Price | |
| 6,112,757 A | 9/2000 | Tseng | |
| 6,129,102 A | 10/2000 | Carter | |
| 6,142,699 A * | 11/2000 | Pao | 403/109.5 |
| 6,148,835 A | 11/2000 | Rhee | |
| 6,179,514 B1 | 1/2001 | Cheng | |
| 6,230,729 B1 | 5/2001 | Carter | |
| 6,263,895 B1 | 7/2001 | Bang | |
| 6,363,956 B2 | 4/2002 | Carter | |
| 6,412,507 B1 | 7/2002 | Carter | |
| 6,508,262 B1 | 1/2003 | Takayama | |
| 6,516,821 B1 | 2/2003 | Uemura | |
| 6,520,196 B2 | 2/2003 | Carter | |
| 6,536,723 B1 * | 3/2003 | Nakatani | 248/163.1 |
| 6,551,226 B1 | 4/2003 | Webber et al. | |
| 6,575,656 B2 | 6/2003 | Suh | |
| 6,591,849 B1 | 7/2003 | Swetish et al. | |
| 6,712,083 B2 | 3/2004 | Carter | |
| 6,837,642 B1 | 1/2005 | Lin | |
| 6,908,249 B2 | 6/2005 | Tomm | |
| 6,913,231 B2 | 7/2005 | Speggiorin | |
| 6,981,510 B2 | 1/2006 | Carter | |
| 7,040,832 B2 | 5/2006 | Hsieh | |
| 7,066,676 B2 | 6/2006 | Tsai | |
| 7,097,380 B2 | 8/2006 | Lee | |
| 7,240,687 B2 | 7/2007 | Carter | |
| 7,293,934 B1 | 11/2007 | Huang | |
| 7,296,584 B2 | 11/2007 | Goldwitz | |
| 7,302,745 B2 | 12/2007 | Stahle | |
| 7,373,708 B2 | 5/2008 | Stahle et al. | |
| 7,380,563 B2 | 6/2008 | Seo | |
| 7,395,830 B2 | 7/2008 | Seo | |
| 7,409,963 B2 | 8/2008 | Mallookis et al. | |
| 7,422,026 B2 | 9/2008 | Kim | |
| 7,481,236 B2 | 1/2009 | Carter | |
| 7,494,296 B2 | 2/2009 | Stahle | |
| RE40,657 E | 3/2009 | Suh | |
| 7,637,276 B2 | 12/2009 | Mallookis et al. | |
| 7,673,643 B2 | 3/2010 | Seo | |
| 7,703,469 B2 | 4/2010 | Danzinger | |
| 7,735,504 B2 | 6/2010 | Carter | |
| 7,753,064 B2 | 7/2010 | Sy-Facunda | |
| 7,757,916 B1 | 7/2010 | Petrie et al. | |
| 7,775,229 B2 | 8/2010 | Sy-Facunda | |
| 7,784,480 B2 | 8/2010 | Sy-Facunda | |
| 7,806,381 B2 | 10/2010 | Sisk Horne et al. | |
| 7,849,867 B2 | 12/2010 | Takayama | |
| 7,874,303 B2 | 1/2011 | Xie | |
| 7,921,864 B2 | 4/2011 | Carter | |
| 7,954,272 B2 | 6/2011 | Potterfield et al. | |
| 7,967,259 B2 | 6/2011 | Nakatani | |
| 7,975,712 B2 | 7/2011 | Beacco | |
| 7,980,519 B2 | 7/2011 | Chen | |
| 8,025,455 B2 | 9/2011 | Huang et al. | |
| 8,074,669 B2 | 12/2011 | Collins et al. | |
| 8,075,217 B2 | 12/2011 | Eason | |
| 8,079,380 B2 | 12/2011 | Engstrom et al. | |
| 8,128,306 B2 | 3/2012 | Gorza | |
| 8,162,280 B2 | 4/2012 | Yu et al. | |
| 8,185,979 B2 | 5/2012 | Hentschel | |
| 8,191,744 B2 | 6/2012 | Petrie et al. | |
| 2002/0030146 A1 * | 3/2002 | Akaike | 248/157 |
| 2003/0090904 A1 | 5/2003 | Ching | |
| 2004/0101351 A1 | 5/2004 | Pitcher | |
| 2005/0194030 A1 | 9/2005 | Goldwitz | |
| 2005/0205124 A1 | 9/2005 | Goldwitz | |
| 2006/0051159 A1 | 3/2006 | Tsai | |
| 2006/0062632 A1 | 3/2006 | Jang | |
| 2006/0169311 A1 | 8/2006 | Hwang | |
| 2007/0012346 A1 | 1/2007 | Choi | |
| 2007/0204897 A1 | 9/2007 | Habib et al. | |
| 2008/0035194 A1 | 2/2008 | Goldwitz | |
| 2008/0087313 A1 | 4/2008 | Jang | |
| 2009/0087251 A1 | 4/2009 | Chen | |
| 2010/0064739 A1 | 3/2010 | Lu | |
| 2010/0101617 A1 | 4/2010 | Stehly | |
| 2010/0269877 A1 | 10/2010 | Sy-Facunda | |
| 2011/0023925 A1 | 2/2011 | Johnson et al. | |
| 2011/0274481 A1 | 11/2011 | Chen | |
| 2012/0006373 A1 | 1/2012 | Stehly | |
| 2012/0034023 A1 | 2/2012 | Wang et al. | |
| 2012/0107037 A1 | 5/2012 | Huang | |
| 2012/0146354 A1 | 6/2012 | Lofley, Sr. et al. | |

\* cited by examiner

US 8,746,267 B2

HEIGHT-ADJUSTABLE CANOPY LEG

RELATED APPLICATION

This application, claims the benefit of U.S. Provisional Patent Application No. 61/708,520, filed Oct. 1, 2012, the entire contents of which are incorporated herein by reference.

BACKGROUND

Field of the Invention

The inventions disclosed herein relate generally to height-adjustable canopy legs and locking mechanisms therefor, including locking mechanisms for infinitely height-adjustable canopy legs and selectively fixedly securing sections of telescoping canopy legs relative to each other to prevent movement there between.

SUMMARY

In some embodiments, a canopy structure comprises a plurality of support members, each of the plurality of support members comprising a first leg and a second leg, the second leg of each of the plurality of support members telescopically slideable within the first leg of each of the plurality of support members to adjust a height of the canopy structure; a plurality of eaves, each of the plurality of eaves coupled to a top end of each of the plurality of support members, each of the plurality of eaves comprising at least one scissor-jack member moveable between an extended position and a collapsed position; and a plurality of locking members, each of the plurality of locking members coupled to the first leg of one of the plurality of support members, each of the plurality of locking members comprising a locking lever comprising a handle portion and a cam portion, the locking lever moveable between an unlocked position and a locked position; and a friction member engageable with the cam portion of the locking lever, wherein the friction member is configured to apply a radial inward force received by an area of the second leg of the one of the plurality of support members when the locking lever is in the locked position.

In some embodiments, a canopy structure comprises a support member, the support member comprising a first leg and a second leg, the second leg telescopically slideable within the first leg to adjust a height of the canopy structure; an eave coupled to a top end of the support member, the eave comprising at least one scissor-jack member moveable between an extended position and a collapsed position; and a locking member coupled to the first leg, the locking member adjustable between a locked and an unlocked position, wherein the locking member is configured to apply a radial inward force received by an area of the second leg when the locking member is in the locked position.

In some embodiments, a canopy structure includes at least one support member. The support member includes a first leg and a second leg. The first leg and the second leg are telescopically engaged with one another for movement along an adjustment axis to permit adjustment of a height of the support member. An upper frame includes at least one eave coupled to an upper end of the support member. The eave includes at least one scissor-jack member moveable between an extended position and a collapsed position. A canopy cover is supported by the upper frame. A lock is coupled to the support member and is movable between a locked position and an unlocked position. A portion of the lock is configured to apply a retaining force to a surface of one of the first leg and the second leg when the lock is in the locked position to retain the first leg and the second leg in a fixed position relative to one another. The retaining force is applied to the surface in a direction substantially perpendicular to the adjustment axis.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
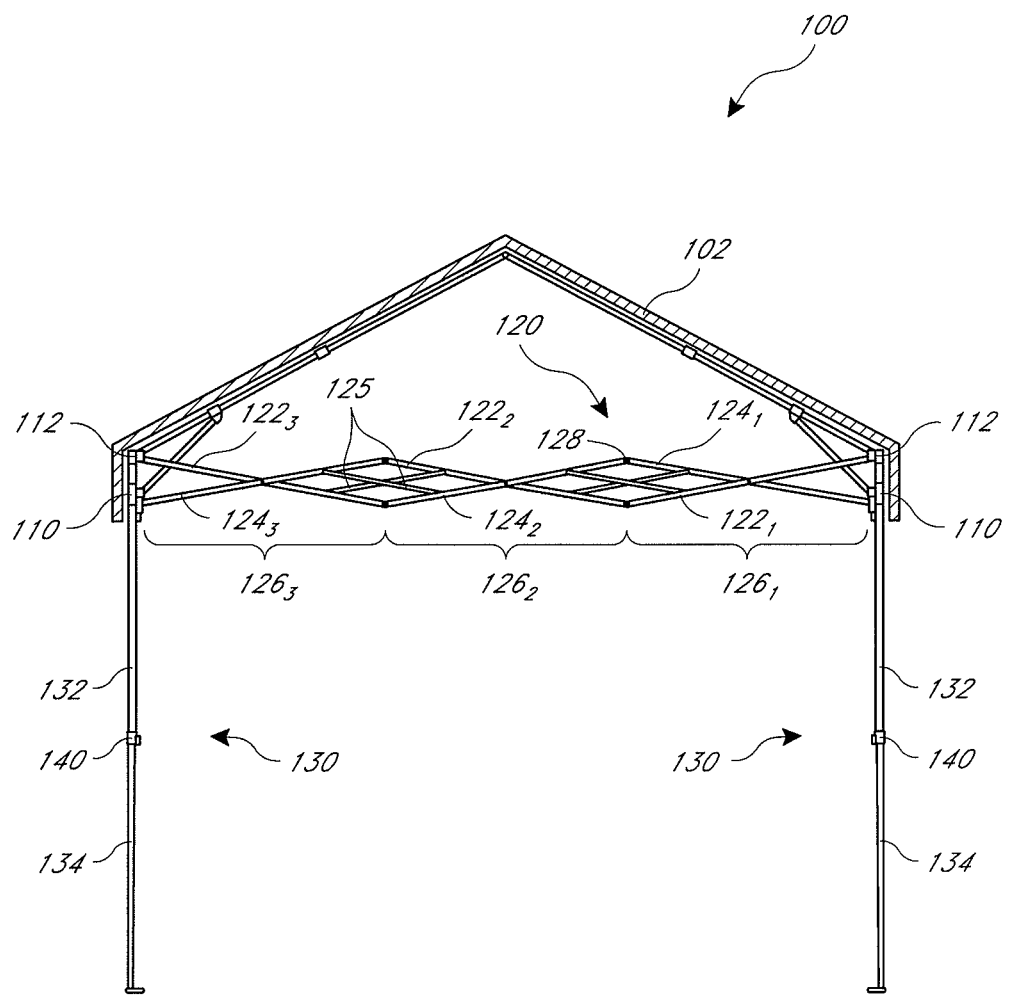
FIG. 1 is a front plan view of an embodiment of a canopy structure having an upper frame portion and a plurality of height-adjustable telescoping support legs.

In some embodiments, a canopy structure comprises a plurality of telescoping support leg assemblies, or support legs. The plurality of support legs each can comprise a first (e.g., outer) leg member, or first leg, and a second (e.g., inner) leg member, or second leg, telescopically slideable within the first leg. In some embodiments, this arrangement can be reversed. The first and second legs of each of the plurality of support legs can provide for infinite adjustment of a height of the canopy structure within an available range of adjustment. That is, instead of providing a small number of discrete adjustment positions, the support legs can permit adjustment to any relative position of the first and second legs within an adjustment range. Advantageously, with such an arrangement, the user can adjust the height of any or all of the support legs to an exact desirable height rather than one of a few available heights, none of which may meet the needs or desires of the user for the specific application or conditions. In addition, the canopy structure preferably includes an upper frame portion that supports a canopy cover. The upper frame portion can include, possibly among other features, a plurality of eaves comprising one or more scissor-jack members moveable between an extended position and a collapsed position to permit the canopy to be moved between a collapsed and an expanded position. In some arrangements, an eave extends between and interconnects each pair of support legs. Thus, the number of support legs and eaves can be identical. However, in other arrangements, the number of support legs and the number of eaves can be different from one another.

The canopy structure can comprise one or more locking members or locks. Preferably, a locking member is provided for each of the support legs. In some arrangements, the locking member is secured to one of the first and second legs and, in a locked position, engages the other of the first and second legs to secure the first and second legs in a desired relative position or height. The locking members can be coupled to the outer telescoping canopy legs, such as in the illustrated arrangements, or, alternatively, can be coupled to the inner telescoping canopy legs. The locking members can be adjustable between a locked and an unlocked position. The locking members can be configured to apply a radial inward force to frictionally engage the first and second telescoping legs. For example, the locking member can be configured to apply a radial inward force received by the inner telescoping leg when the locking member is in the locked position. Preferably, the locking members can be configured to apply sufficient radial inward force to support the canopy structure at a fixed height, at least in response to normal forces applied to the canopy structure. In some arrangements, the retaining force is applied to localized area, a relatively small area or along a portion of a perimeter of the leg. For example, the retaining force can be applied to only one side of the leg. However, in other arrangements, the retaining force can be applied to a significant area, such as a significant portion or substantial entirety of a perimeter of the leg. For example, in some arrangements, the locking members can be configured, in a locked position, to reduce a perimeter of at least a portion of the locking member to apply a squeezing force to one of the inner and outer (or first and second) telescoping legs to secure the support leg in a desired relative position or height.

In some embodiments, the outer telescoping leg can comprise a window. The locking member can be configured to apply radial inward force to the inner telescoping leg through the window.

As discussed above, in some embodiments, the locking member can be configured to apply radial inward force to a localized portion of the inner telescoping leg. In other embodiments, the locking member can be configured to distribute the radial inward force around a perimeter of the telescoping canopy legs. The locking member can be contoured to an outer surface of the inner and/or outer telescoping leg.

For the purpose of understanding particular embodiments, reference will be made to the drawings.

FIG. 1 shows a front plan view of one embodiment of a canopy frame 100 for a collapsible canopy shelter. In this embodiment, canopy frame 100 comprises a plurality of eaves 120 linking a plurality of canopy or support leg assemblies (also referred to as "support legs" or "poles") 130. The canopy frame 100 can support a canopy cover 102. The canopy legs 130 can comprise a first upper telescoping canopy-leg section (also referred to as a "leg") 132 and a second bottom telescoping canopy-leg section or leg 134. The upper telescoping canopy leg 132 and bottom telescoping canopy leg 134 can be fixedly secured relative to each other by lock member or lock assembly (also referred to as a "lock") 140. Each eave 120 can comprise a series of pivotally coupled scissor-jack members $126_1$, $126_2$, $126_3$, ... $126_N$. Each scissor-jack member $126_1$, $126_2$, $126_3$, ... $126_N$ can include a first cross member $122_1$, $122_2$, $122_3$, ... $122_N$ and a second cross member $124_1$, $124_2$, $124_3$, ... $124_N$, crossed and pivotally coupled at a cross point 128. In some embodiments, to provide additional rigidity to improve the structural integrity of canopy frame 10, two reinforcing cross members 125 may be crossed and pivotally coupled to the first cross members and second cross members at each intersection of scissor jack members $126_1$, $126_2$, $126_3$, ... $126_N$. All pivoting joints may be pinned, bolted, riveted, joined by rotational fasteners, or otherwise rotatively connected as is known in the art.

Each eave 120 can be collapsibly coupled to a pair of upwardly extending poles 130 through two fixed eave mounts 112 and two sliding eave mounts 110. Fixed eave mounts 112 may be fixably coupled to the top ends of the upwardly extending poles 130, and sliding eave mounts 110 can be slidably coupled to the poles 130 such that sliding eave mounts 110 can slide in the direction of the length of upwardly extending poles 130. The cross members can be pivotally coupled to the eave mounts. For example, first cross member $122_1$ can be pivotally coupled to a first fixed eave mount 112, and first cross member $122_3$ can be pivotally coupled to a second fixed eave mount 112. Second cross member $124_1$ can be pivotally coupled to a first sliding eave mount 110, and second cross member $124_3$ can be pivotally coupled to a second sliding eave mount 110. As shown in FIG. 1, the sliding eave mounts 110 are shown in a fixed extended position such as when a canopy is in a fully-opened position. When the sliding eave mounts 110 are slid down the upwardly extending poles 130 in a downward direction denoted by the arrow A, the canopy frame 110 can transition from a fully-opened position toward or to a closed position, and scissor-jack members $126_1$, $126_2$, $126_3$, ... $126_N$ can collapse in a manner similar to the compression of an accordion.

Figure 2:
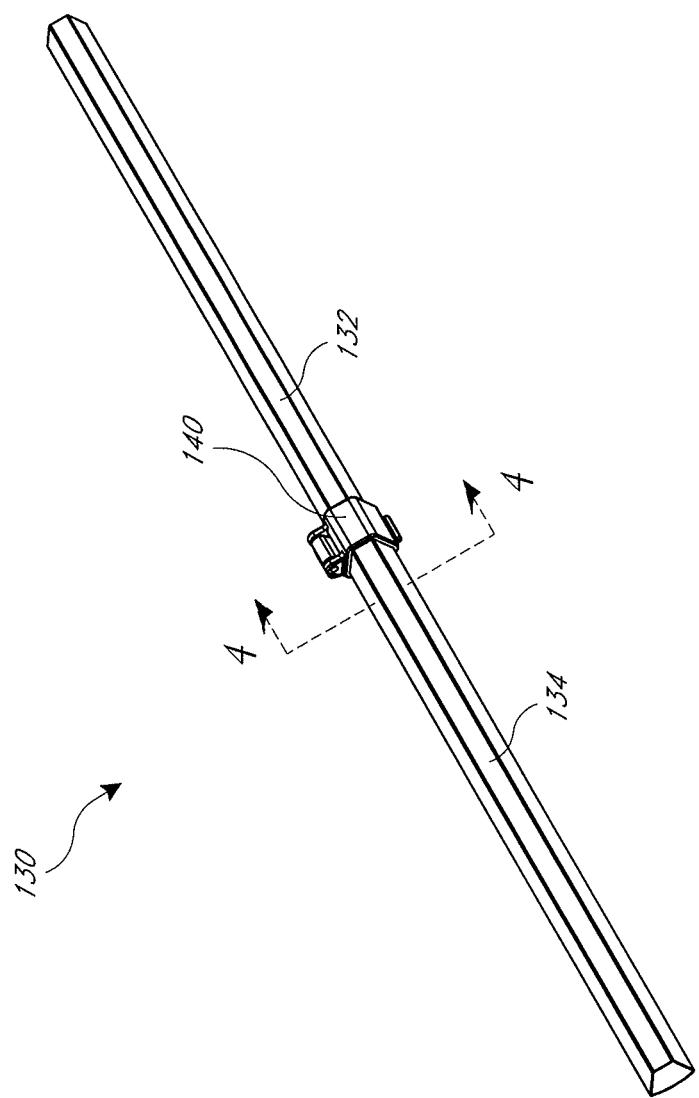
FIG. 2 is a perspective view of a height-adjustable telescoping support leg of FIG. 1 separate from the canopy structure. The leg includes a lock that secures the telescoping support leg in a desired height position.

FIG. 2 shows a perspective view of the canopy leg or support leg 130 separate from the canopy 100. As described above, the canopy leg 130 comprises a first upper telescoping canopy-leg section 132 and a second bottom telescoping canopy-leg section 134. The upper telescoping canopy-leg section 132 and the bottom telescoping canopy-leg section 134 can comprise different cross-sectional areas and hollow interiors. For example, the upper telescoping canopy-leg section 132 can comprise a larger cross-sectional area than the bottom telescoping canopy-leg section 134. The different cross sectional areas and hollow interiors of the upper telescoping canopy-leg section 132 and bottom telescoping canopy-leg section 134 allow the upper telescoping canopy-leg section 132 and bottom telescoping canopy-leg section 134 to telescopically move relative to each other. For example, the interior of the upper telescoping canopy-leg section 132 can slide down the exterior of the bottom telescoping canopy-leg section 134.

The upper telescoping canopy-leg section 132 and a bottom telescoping canopy-leg section 134 can each comprise five sides and faun a generally pentagram-shaped cross section. In alternative embodiments, the upper telescoping canopy-leg section 132 and a bottom telescoping canopy-leg section 134 can comprise any other number of sides, such as three sides to form a generally triangular cross section, four sides to form a generally rectangular cross section, and six sides to form a generally hexagonal cross section. In other embodiments, the upper telescoping canopy-leg section 132 and a bottom telescoping canopy-leg section 134 can each have a generally trapezoidal cross-sectional shape. In other alternative embodiments, the upper telescoping canopy-leg section 132 and a bottom telescoping canopy-leg section 134 can feature curved sides having circular or elliptical cross sections, for example. In other alternative embodiments, the upper telescoping canopy-leg section 132 and a bottom telescoping canopy-leg section 134 can feature generally symmetrical or asymmetrical geometric or round/oval profiles. The leg sections 132, 134 can be of the same shape or different, but preferably complementary shapes.

The upper telescoping canopy-leg section 132 and bottom telescoping canopy-leg section 134 can be fixedly secured relative to each other by a lock, such as a lever-activated lock arrangement 140. However, lock 140 could also be actuated or operated via another suitable mechanism, such as a push-button or rotational knob, for example. When locked, the lever-activated lock 140 can selectively fixedly secure the upper telescoping canopy-leg section 132 and the bottom telescoping canopy-leg section 134 relative to each other to prevent movement therebetween, at least in response to normal or expected forces applied to the canopy 100 or leg 130. For example, the lever-activated lock 140 can support the upper telescoping canopy-leg section 132 and the bottom telescoping canopy-leg section 134 in a fully-extended position. When in a fully extended position, the canopy leg 130 can be at a maximum height. The lever-activated lock 140 also can support the upper telescoping canopy-leg section 132 and the bottom telescoping canopy-leg section 134 at any other relative position within an available adjustment range, thereby providing a range of heights for the canopy leg 130. When unlocked, the lever-activated lock 140 can allow the upper telescoping canopy-leg section 132 and the bottom telescoping canopy-leg section 134 to telescopically move relative to each other to provide height adjustment of the canopy leg 130. In some embodiments, the lever-activated lock 140 can be fixed proximate a bottom end of the upper telescoping canopy-leg section 132. In the illustrated arrangement, the lock 140 is secured to the upper leg 132 and engages the lower leg 134; however, this arrangement could be reversed.

As shown in FIG. 2, the canopy leg 130 comprises two telescoping canopy-leg sections 132, 134 and one lever-activated lock 140. In alternative embodiments, the canopy leg 130 can comprise any number of telescoping canopy-leg sections and lever-activated locks. For example, the canopy leg 130 can comprise three telescoping canopy-leg sections and two lever-activated locks, or four telescoping canopy-leg sections and three lever-activated locks. In general, if a canopy leg 130 comprises n telescoping canopy-leg sections, the canopy leg 130 can comprise n−1 lever-activated locks. Each of the canopy-leg sections can comprise any cross sectional shape, including the shapes described above with respect to the upper telescoping canopy-leg section 132 and a bottom telescoping canopy-leg section 134.

Figure 3:
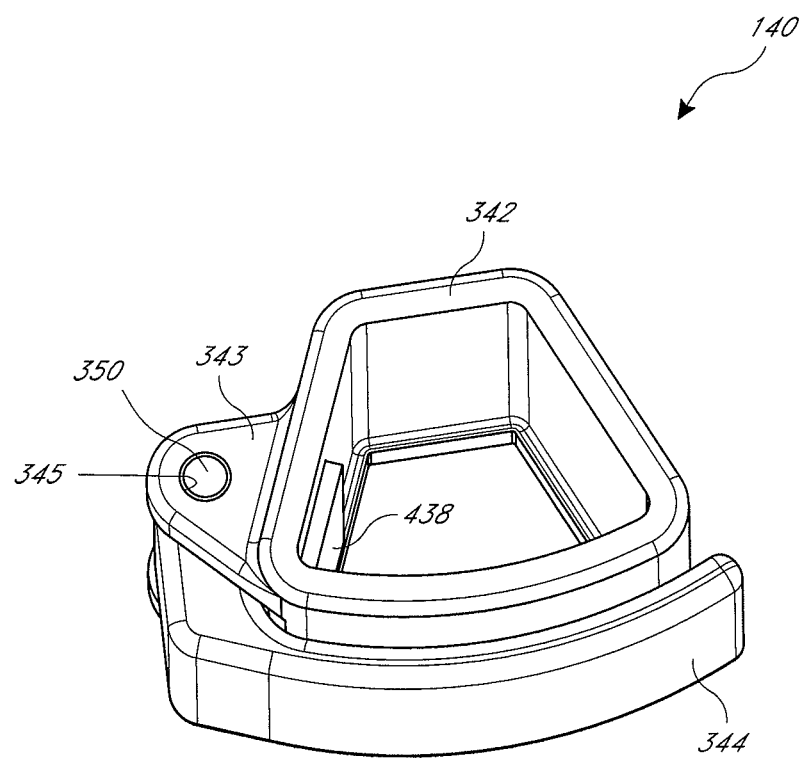
FIG. 3 is a perspective view of the lock of FIG. 2 separate from the telescoping support leg.
Figure 7:
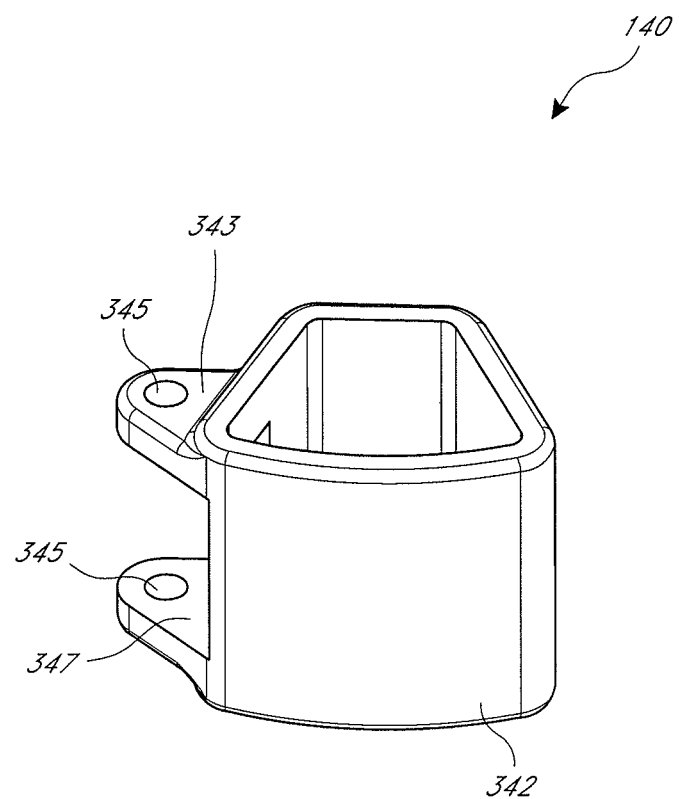
FIG. 7 is a perspective view of a body of the lock of FIG. 3 with a lever removed.

FIG. 3 shows a perspective view of an embodiment of the lever-activated lock 140 separate from the canopy leg 130. The lever-activated lock 140 can comprise a main body, which is referred to herein as an outer collar 342. The lock 140 also includes at least one and preferably a pair of ears 343 and 347 (FIG. 7), which support a lever 344. The outer collar 342 can be defined as a one-piece (i.e., unitary) construction of any suitable material, such as a molded plastic, for example. The one-piece construction can include the ears 343, 347, as illustrated, or the ears 343, 347 can be separate members attached to the outer collar 342. An opening 345 in the ears 343, 347 of the outer collar 342 can receive a cylindrical support member (e.g., a pin, shaft or bolt) 350 that supports the lever 344 for rotation relative to the outer collar 342. As shown in FIG. 3, the lever 344 is in a locked position. When in a locked position, the lever 344 can engage, or cause another member to engage, one of the legs 132, 134 (e.g., the bottom telescoping canopy-leg section 134 in the illustrated arrangement) to fixedly secure them relative to each other to prevent movement there between, at least in response to normal operational loads. The lever 344 can rotate about an axis defined through the opening 345 of the ears 343, 347 and/or support member 350 to transition from a locked position to an unlocked position. In use, the lever 344 can be positioned at any desired location around a perimeter of the canopy leg 130. For example, in some arrangements, the lever 344 is positioned generally or substantially on an outside of the canopy leg 130 relative to the canopy 100 as a whole. In other arrangements, the lever 344 can be positioned on the inside of the canopy leg 130.

Figure 4:
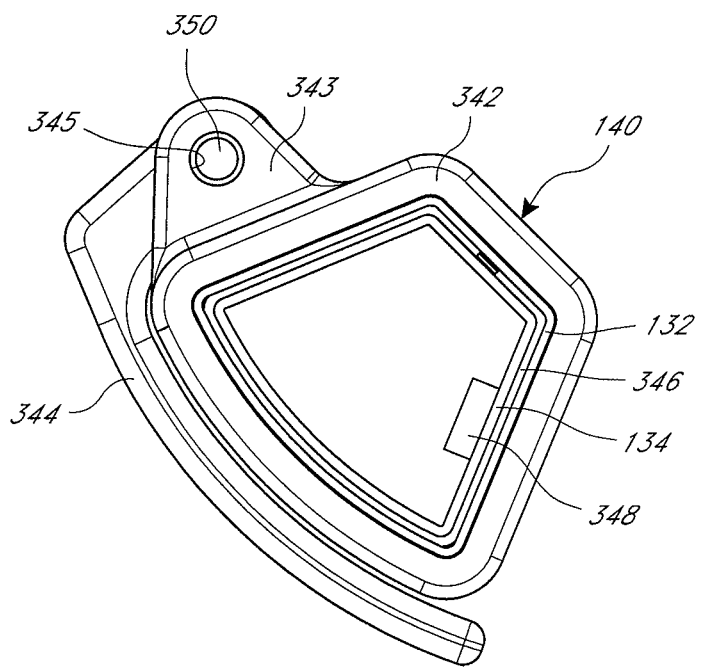
FIG. 4 is a cross-sectional view of the support leg and lock taken along the line 4-4 of FIG. 2.
Figure 5:
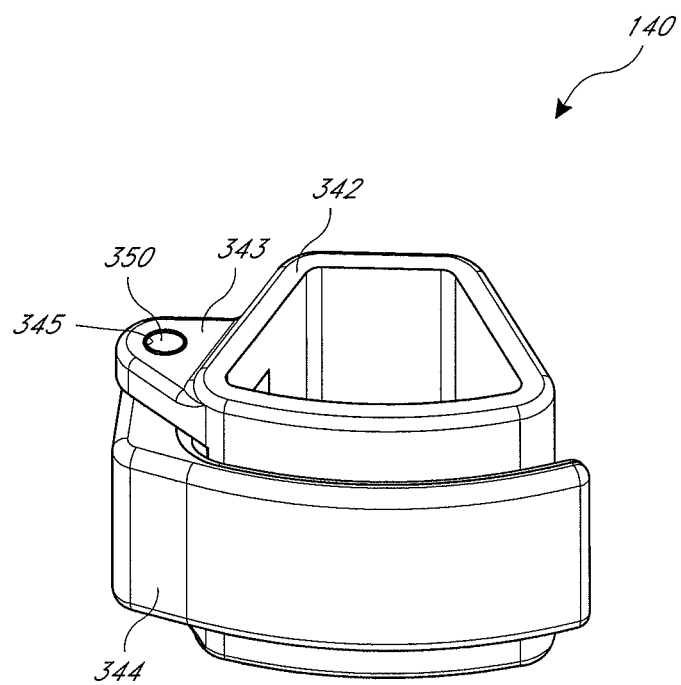
FIG. 5 is another perspective view of the lock of FIG. 3.
Figure 6:
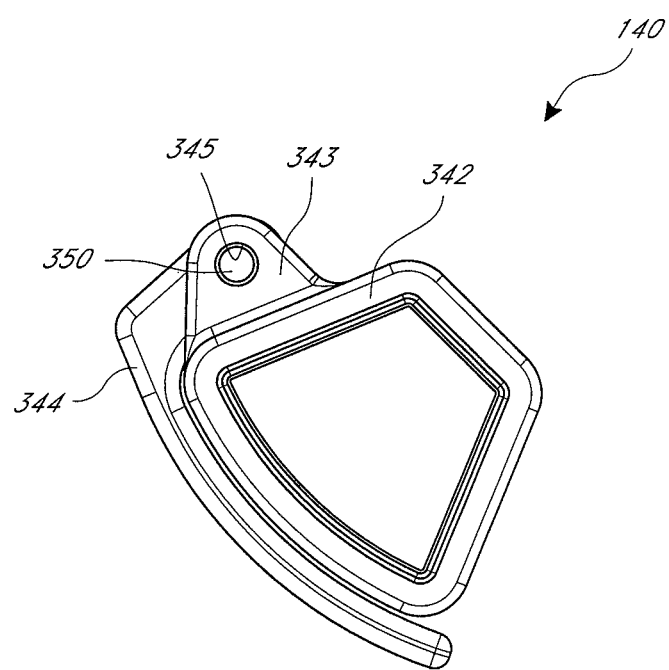
FIG. 6 is a top view of the lock of FIG. 3.
Figure 8:
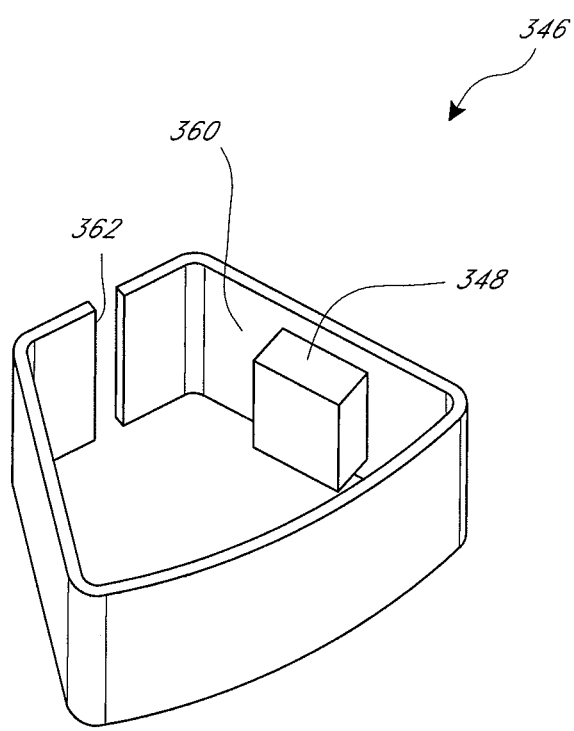
FIG. 8 is a perspective view of an inner collar member of the support leg of FIG. 2.
Figure 10:
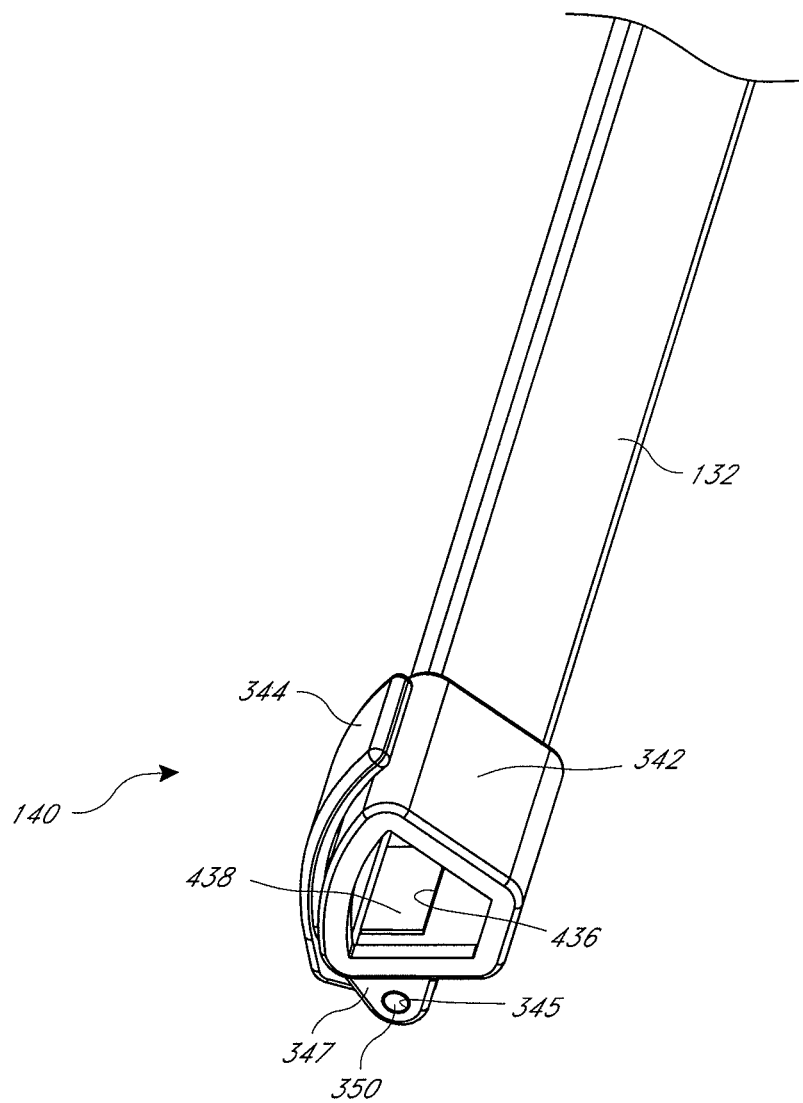
FIG. 10 is a perspective view of the support leg of FIG. 2 with a lower leg member removed to illustrate underlying structure.
Figure 11:
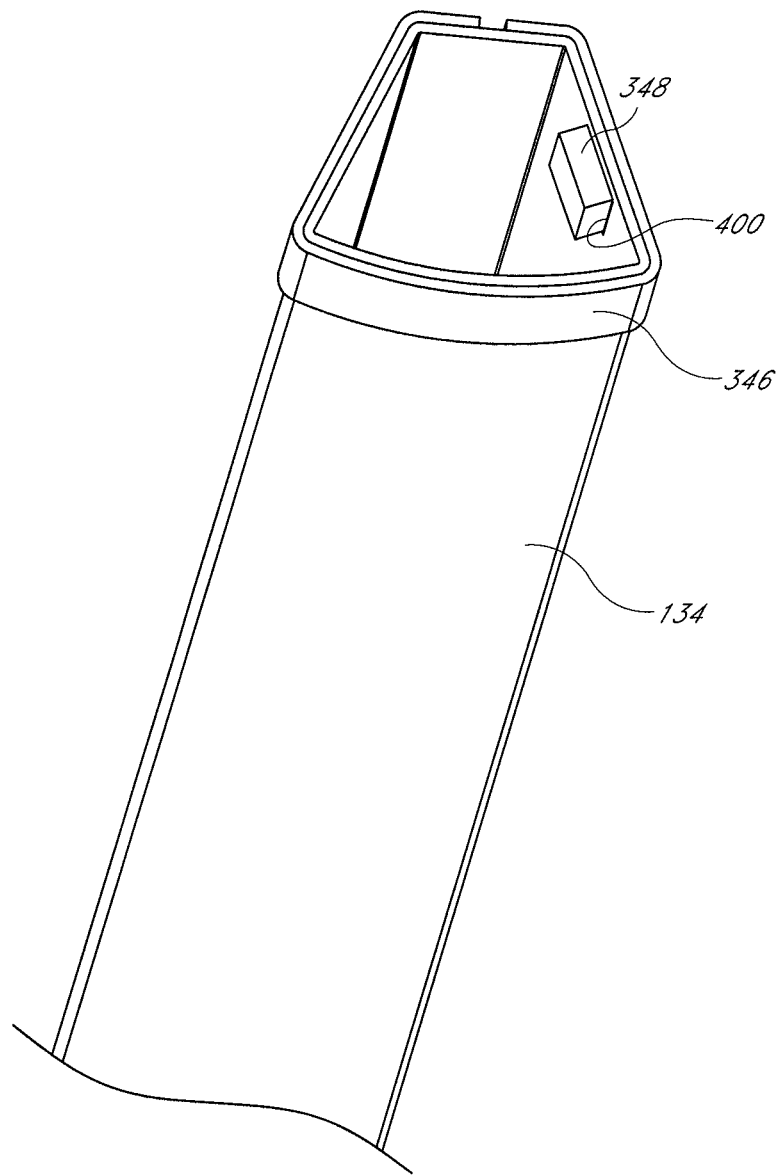
FIG. 11 is a perspective view of an upper portion of the lower leg member with the inner collar member of FIG. 8 installed.

With reference to FIGS. 4, 8 and 11, the canopy leg 130 can include components, structures or arrangements configured to facilitate sliding motion of the legs 132, 134 relative to one another and/or inhibited unintentional or undesirable separation of the legs 132, 134. For example, the canopy leg 130 can include an inner collar or bushing 346 comprising a generally annular body 360 and a collar positioning member or retainer 348, which can engage a corresponding opening 400 in one of the legs 132, 134. In the illustrated arrangement, the inner collar 346 is secured at or near an upper end of the inner or lower leg 134. Preferably, the body 360 has a shape similar to the cross-sectional shape of the legs 132, 134 and a thickness selected to occupy a significant portion or a substantial entirety of the space between the outer leg 132 and the inner leg 134. Thus, the inner collar 346 can act as a sliding member or bushing (solid bearing) to facilitate smooth movement between the legs 132, 134. The inner collar 346 can be constructed of any suitable material, but may be a plastic material, such as a low friction or self-lubricating plastic material. Preferably, the inner collar 346 includes a slot 362 interrupting the perimeter of the body 360 to facilitate assembly of the inner collar 346 onto the leg 134. The inner collar 346 can also inhibit undesired or unintentional disengagement of the legs 132, 134 by contacting a member or portion of one of the legs 132, 134 in an extended position of the canopy leg 130. For example, the inner collar 346 can contact a portion of the lock 140, such as an engagement or friction member 438 (FIG. 10) of the lock 140, for example and without limitation. Alternatively, the inner collar 346 can contact a dedicated stop provided on the outer leg 132.

FIG. 8 shows a perspective view of the inner collar member 346 removed from the canopy leg 130. As described above, the collar member 346 is configured so that it can be radially constricted to facilitate assembly to one of the telescoping canopy-leg sections 132, 134 (e.g., the inner leg 134 as shown in FIG. 11). In addition, the inner collar member 346 can occupy some or all of a space between the inner and outer telescoping leg sections 132, 134 to facilitate movement of the inner and outer telescoping leg sections 132, 134 relative to each other with reduced friction when the locking member 140 is in an unlocked position.

Figure 9:
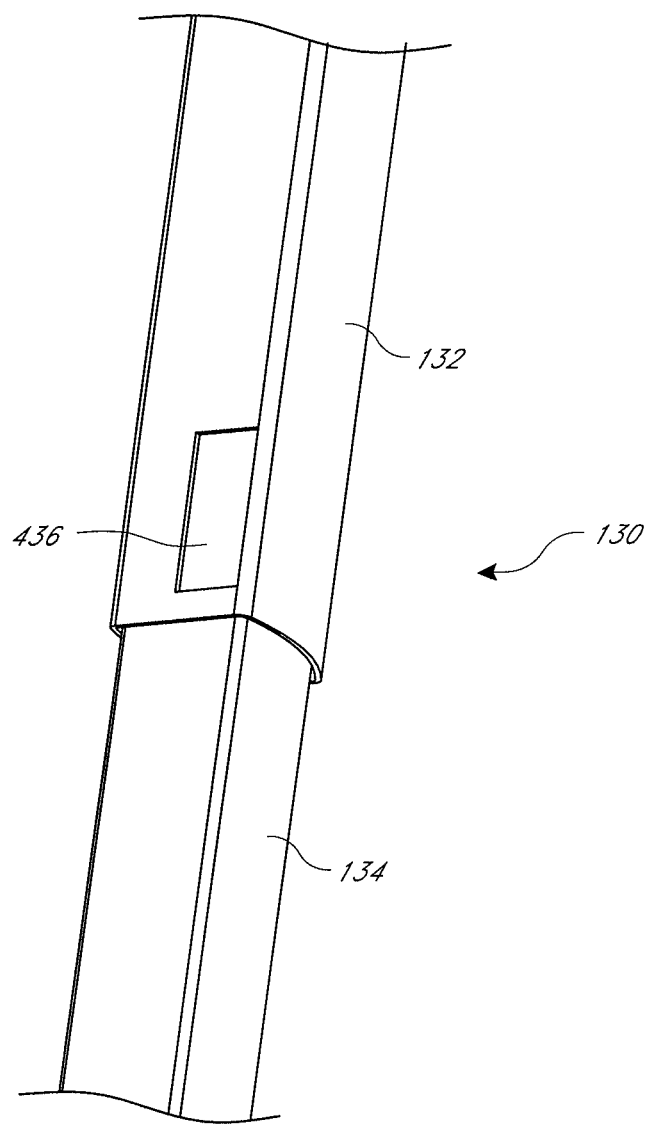
FIG. 9 is a perspective view of a portion of the support leg of FIG. 2 with the lock removed to illustrate underlying structure.

FIG. 9 shows a perspective view of the canopy leg 130 with the lock 140 removed. In some configurations, an opening or window 436 is provided at or near a bottom end of the upper telescoping canopy-leg section 132 to facilitate engagement of the lock 140 with the lower telescoping canopy-leg section 134. Preferably, a portion of the lock 140 extends through the opening 436 and contacts the lower telescoping canopy-leg section 134. Such an arrangement allows a substantial portion or a substantial entirety of the lock 140 to surround the upper telescoping canopy-leg section 132 while still being able to engage the lower telescoping canopy-leg section 134. However, in other arrangements, the lock 140 could contact or otherwise engage the lower telescoping canopy-leg section 134 at a location below the upper telescoping canopy-leg section 132. The illustrated opening 436 is surrounded on all sides by the upper telescoping canopy-leg section 132; however, in other arrangements, the opening 436 could extend to an end of the upper telescoping canopy-leg section 132 and be open on at least one side. Furthermore, the opening 436 is generally rectangular in shape, but could be other shapes, as well. In addition, the opening 436 is positioned entirely on one side of the upper telescoping canopy-leg section 132, but could extend over two or more sides of the upper telescoping canopy-leg section 132 depending on how much contact or engagement surface area is desired. Thus, contacting multiple sides can permit sufficient contact or engagement surface area without increasing a height of the lock 140.

FIG. 10 shows a perspective view of the lever-activated lock 140 secured to the upper telescoping canopy-leg section 132 with the lower telescoping canopy-leg section 134 removed. In some configurations, a portion of the lever 344 can extend through the opening 436 and contact the lower telescoping canopy-leg section 134. However, in the illustrated arrangement, the lever 344 causes another component to contact the lower telescoping canopy-leg section 134. For example, an engagement or friction member 438 can be received within the window or opening 436 in the upper telescoping canopy-leg section 132 and facilitate engagement of the lever-activated lock 140 with the upper telescoping canopy-leg section 132. Thus, the lever 344 or other portion of the lock 140 can indirectly contact the lower telescoping canopy-leg section 134 by applying a force to the engagement or friction member 438, which in turn applies a force to the lower telescoping canopy-leg section 134. With such an arrangement, the engagement or friction member 438 can be constructed of a suitable material for its purpose, such as a friction-enhancing material, and the lever 344 can be constructed of a suitable material for its purpose, thereby permitting separate optimization of each component. The illustrated engagement or friction member 438 has the same shape as, and occupies a substantial entirety of, the opening 436. In other arrangements, the engagement or friction member 438 may simply be capable of passing through the opening 436 and, thus, may be of a complementary shape rather than a substantially identical shape.

Figure 12:
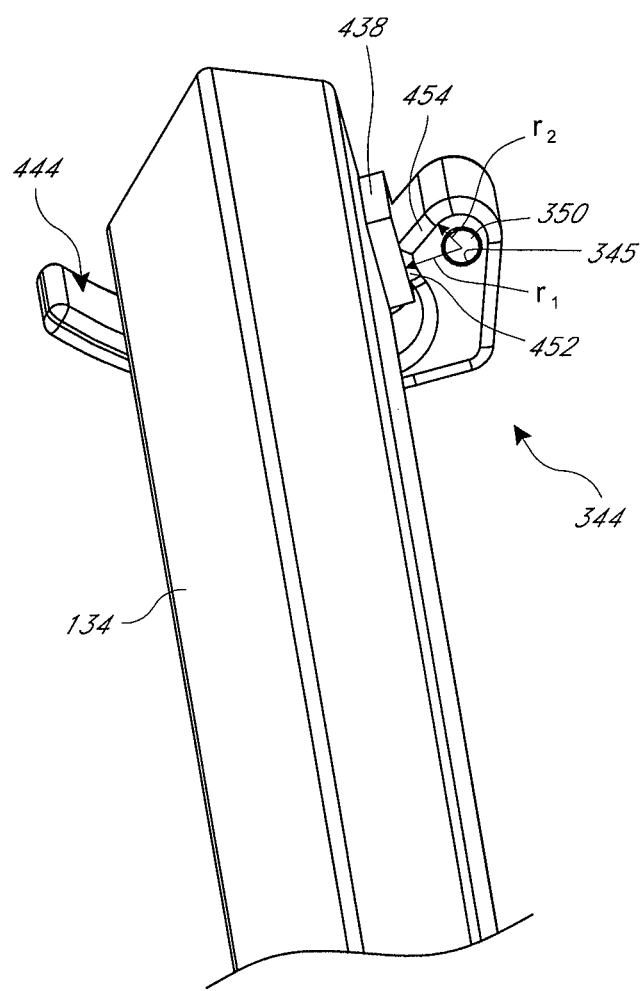
FIG. 12 is a perspective view of the lower leg member, lever and a force transfer member of the support leg of FIG. 2 with other parts removed and the lever in a locked position.

FIG. 12 shows a side perspective view of the lower telescoping canopy-leg section 134 with the upper telescoping canopy-leg section 132 and the outer collar 342 of the lock 140 removed to reveal underlying structure. As described above, the upper telescoping canopy-leg section 132 and the lower telescoping canopy-leg section 134 can be fixedly secured relative to each other by the lock or lever-activated lock 140. Preferably, in some arrangements, to provide wide range of adjustment options, the upper telescoping canopy-leg section 132 and the lower telescoping canopy-leg section 134 can be secured in any relative position within an available range of adjustment, which, in some arrangements, can be a substantial entirety of a length of the upper telescoping canopy-leg section 132 or the lower telescoping canopy-leg section 134. Such an arrangement is referred to herein as "infinitely" adjustable. To accommodate such infinite adjustment, the lock 140 preferably contacts or engages a side surface of the lower telescoping canopy-leg section 134 and inhibits or prevents movement of the lower telescoping canopy-leg section 134 relative to the upper telescoping canopy-leg section 132 via a friction force or a clamping force in contrast to the interference or interlocking (e.g., pin-in-hole) arrangements of existing canopy legs. Thus, the illustrated lock 140 does not rely on a small number of discrete adjustment locations. Preferably, the lock 140 exerts a radial or lateral force on the lower telescoping canopy-leg section 134. That is, preferably, the direction of a force applied to the lower telescoping canopy-leg section 134 is in a direction substantially perpendicular to a direction of relative movement of the canopy leg 130, which is a length direction of the canopy leg 130 in the illustrated arrangement. However, in other arrangements, the illustrated lock 140 (or any other embodiment of the lock 140 disclosed herein) can be implemented in a discrete-adjustment arrangement in which a number of discrete adjustment positions are provided. For example, such an arrangement can utilize through-holes or indentations in the canopy leg 130 that can be engaged by a locking member, such as a pin, for example.

When locked, the lever-activated lock 140 can selectively fixedly secure the first telescoping canopy-leg section 132 and the second telescoping canopy-leg section 134 relative to each other to inhibit or prevent movement there between. For example, the lever-activated lock 140 can support the first telescoping canopy-leg section 132 and the second telescoping canopy-leg section 134 in a fully-extended position. When in a fully extended position, the canopy leg 130 can be at a maximum height. The lever-activated lock 140 also can support the first telescoping canopy-leg section 132 and the second telescoping canopy-leg section 134 at any other relative position, thereby providing a range of heights for the canopy leg 130. When unlocked, the lever-activated lock 140 can allow the first telescoping canopy-leg section 132 and the second telescoping canopy-leg section 134 to telescopically move relative to each other to provide height adjustment of the canopy leg 130.

Figure 14:
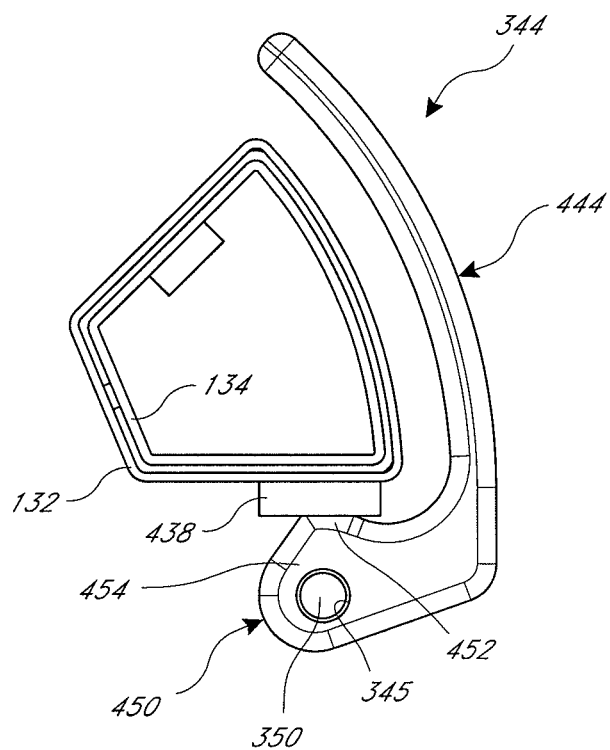
FIG. 14 is a cross-sectional view of the support leg of FIG. 2 with the body of the lock removed and the lever in a locked position.

FIGS. 12 and 14 show the lever 344 of the lock 140 in a locked position. In some embodiments, the lever 344 can comprise a lever handle portion 444 and a cam portion 450. The cam portion 450 of the lever 344 can comprise a first portion of, for example, a first or increased radius 452 (a locking portion) and a second portion of, for example, a second or reduced radius 454 (an unlocking portion). For example, the portion of increased radius 452 can comprise a radius r1 from a center of the aperture 345 or the axis of rotation of the cam portion 450. The portion of decreased radius 454 can comprise a radius r2 from the center of the aperture 1545 or the axis of rotation of the cam portion 450. When the lever 344 is in a locked position, the cam portion 452 can provide a radial inward (or lateral) force engaging a friction member 438 or, in alternative arrangements, directly engaging the lower telescoping canopy-leg section 134. As described above, the friction member 438 can be any member capable of transmitting the radial inward or lateral force. When the lever 344 is in the locked position, the friction member 438 can transmit the radial inward force from the cam portion 452 to frictionally engage the lower telescoping canopy-leg section 134.

Figure 13:
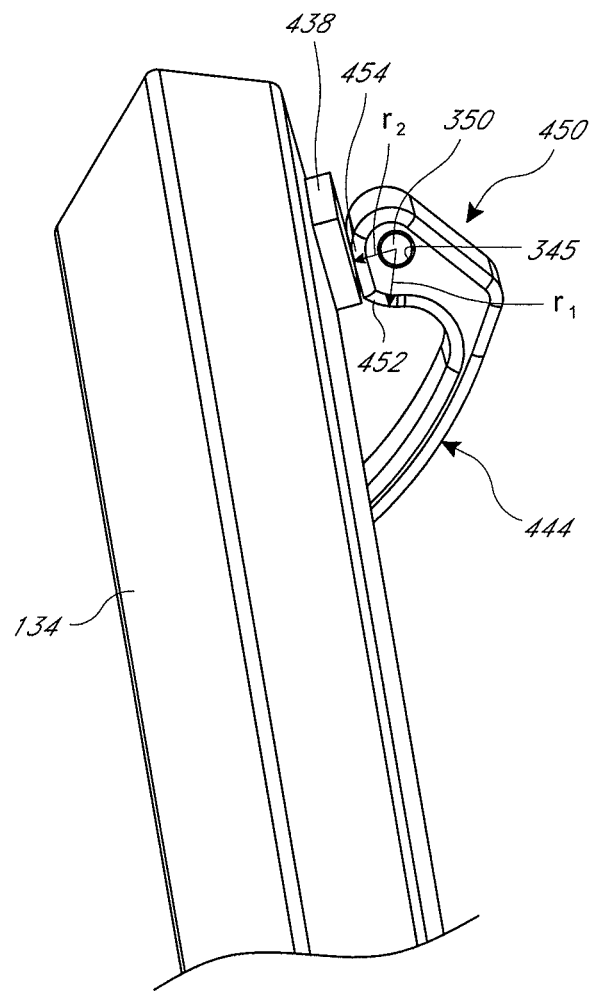
FIG. 13 is a perspective view of the lower leg member, lever and a force transfer member of FIG. 12 with the lever in an unlocked position.
Figure 15:
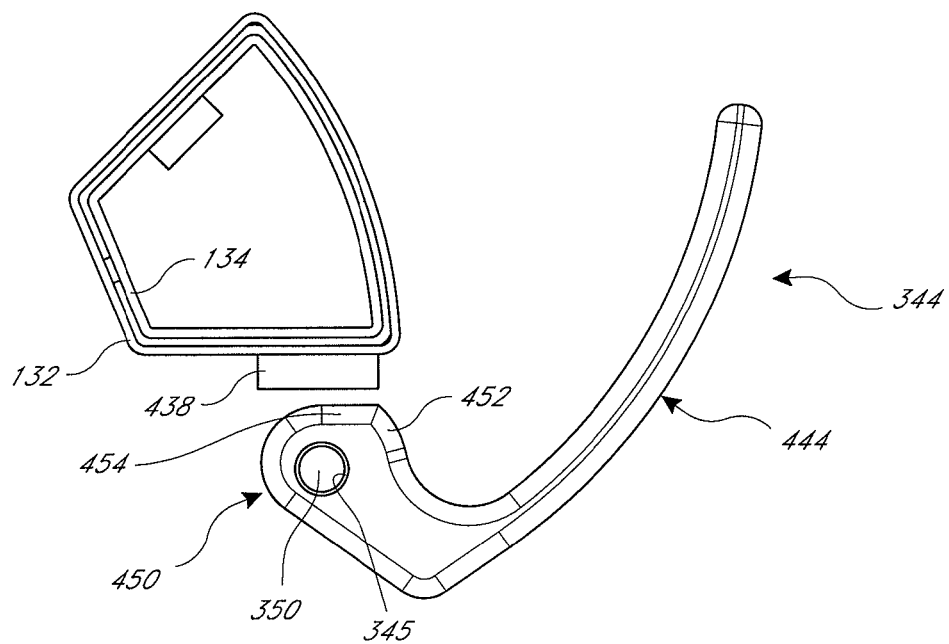
FIG. 15 is a cross-sectional view of the support leg of FIG. 14 with the lever in an unlocked position.

FIGS. 13 and 15 show lever 344 in an unlocked position. In some embodiments, when the lever 344 is in an unlocked position, the cam portion 450 does not engage the friction member 438. For example, when the lever 344 is in the unlocked position, the cam portion of reduced radius 454 can be adjacent to the friction member 438 but not in engagement with the friction member 438 or at least not transmitting a sufficient force to inhibit or prevent relative movement between the upper telescoping canopy-leg section 132 and the lower telescoping canopy-leg section 134.

Figure 16:
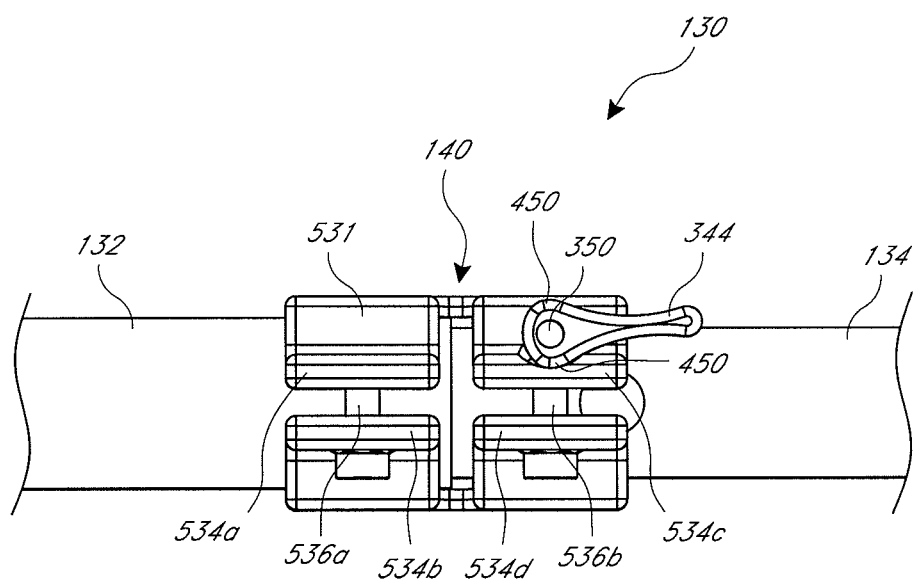
FIG. 16 is a side view of a modification of the height-adjustable telescoping support leg of FIG. 2.
Figure 17:
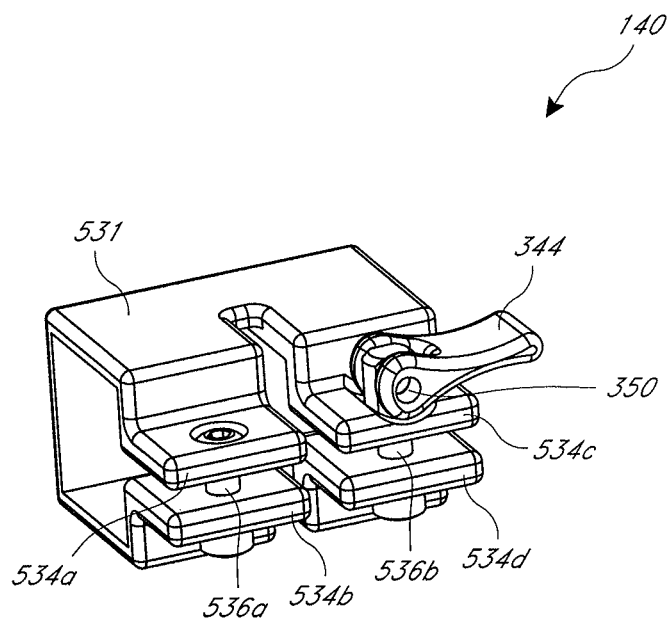
FIG. 17 is a perspective view of a lock of FIG. 16 separate from the support leg.
Figure 18:
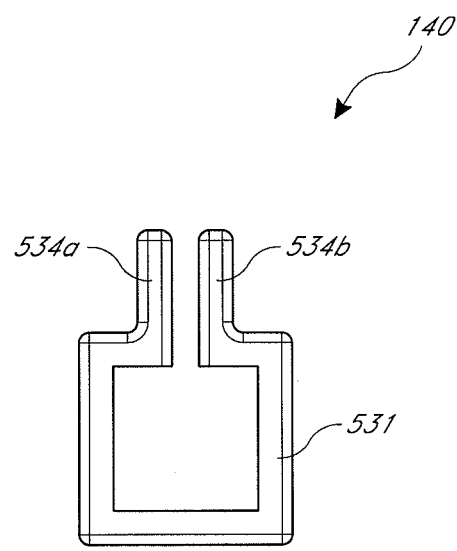
FIG. 18 is an end view of a body of the lock of FIG. 17.

FIGS. 16-18 illustrate a modification of the lock 140 of FIGS. 1-15. Preferably, the lock 140 of FIGS. 16-18 is also a lever-actuated lock; however, it could be actuated or operated via another suitable mechanism, such as a push-button or rotational knob, for example. The lever-activated lock 140 can comprise a body 531, a lever 344, a first ear 534a, a second ear 534b, a third ear 534c, a fourth ear 534d, a first fastener (e.g., screw or bolt-and-nut assembly 536a), and a second fastener (e.g., screw or bolt-and-nut assembly 536b). The body 531 can be defined as a one-piece molded plastic construction. However, in other arrangements, the body 531 can be constructed of multiple components or pieces coupled to one another and/or can be constructed of other suitable materials by other suitable processes. The first fastener 536a can extend between and couple the first ear 534a and second ear 534b. When the first fastener 536a is tightened, the first ear 534a and the second ear 534b are brought in closer proximity to each other such that the body 531 applies a squeezing force to the first telescoping canopy-leg section 132 to secure the body 531 to the first telescoping canopy-leg section 132. Preferably, this is done during manufacture or assembly of the canopy 100 or canopy leg 130.

The second fastener 536b can extend between the third ear 534c and fourth ear 534d. The lever 532 can be coupled to the second fastener 536b and engage the third ear 534c. The lever 344 can rotate about an axis defined by a shaft 350 to transition from a locked position to an unlocked position. When the lever 344 transitions from an unlocked position to a locked position, it effectively shortens a length of a portion of the second fastener 536b that extends between the ears 534c and 534d via the cam portion 450 of the lever 344 to pull the third ear 534c in closer proximity to the fourth ear 534d. As shown in FIG. 16, the lever 344 is in a locked position. When in a locked position, the lever 344 provides for radial constriction of at least a portion of the body 531 that engages the second or lower telescoping canopy-leg section 134 to fixedly secure the first telescoping canopy-leg section 132 and the second telescoping canopy-leg section 134 relative to each other to inhibit or prevent movement there between. Thus, with the illustrated arrangement, the body 531 can apply a squeezing force to an outer surface of the second or lower telescoping canopy-leg section 134 to secure the second telescoping canopy-leg section 134 relative to the first telescoping canopy-leg section 132. In particular, the body 531 of the lock 140 frictionally engages an outer surface of the second telescoping canopy-leg section 134. Preferably, the body 531 applies a force to a substantial entirety of a perimeter of the second telescoping canopy-leg section 134. Therefore, the body 531 can engage any portion of the second telescoping canopy-leg section 134 to provide infinite adjustability within the available range of adjustment. Preferably, the cam portion 450 of the lever 344 includes two locking surfaces such that the lever 344 has two locking positions (e.g., generally aligned with the third ear 534c in either direction). In the unlocked position, the lever 344 extends generally perpendicular to the third ear 534c in the illustrated arrangement.

Although disclosed in the context of a lock for the telescoping canopy legs, any of the locks 140 disclosed herein can find utility in other applications or be modified for use in other applications. For example, any of the locks 140 disclosed herein can be implemented in the sliding eave mounts 110 in a manner similar to the canopy leg applications illustrated in detail herein. With such an arrangement, non-discrete adjustment of the sliding eave mount 110 can be provided, including infinite adjustability within a particular range of adjustment, for example.

The features and attributes of the specific embodiments disclosed above may be combined in different ways to form additional embodiments, all of which fall within the scope of the present disclosure. Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A canopy structure comprising:
a plurality of support members, each of the plurality of support members comprising a first leg and a second leg, the second leg of each of the plurality of support members telescopically slideable within the first leg of each of the plurality of support members to adjust a height of the canopy structure, wherein the first leg and the second leg each have a generally trapezoidal cross-sectional shape having a long side, a short side and a pair of connecting sides extending between the long side and the short side;
a plurality of eaves, each of the plurality of eaves coupled to a top end of at least one of the plurality of support members, each of the plurality of eaves comprising at least one scissor-jack member moveable between an extended position and a collapsed position;
a plurality of locking members, each one of the plurality of locking members coupled to the first leg of a respective one of the plurality of support members, each of the plurality of locking members comprising:
a locking lever comprising a handle portion and a cam portion, the locking lever moveable between an unlocked position and a locked position; and
a friction member engageable with the cam portion of the locking lever, wherein the friction member is configured to apply a force to an outer surface of the second leg of the one of the plurality of support members when the locking lever is in the locked position;
wherein the friction member applies the force to one of the connecting sides and wherein the handle portion of the locking lever extends across an entirety of the long side when the locking lever is in the locked position.

2. The canopy structure of claim 1, wherein the friction member is configured to apply sufficient force to support the canopy structure at a fixed height.

3. The canopy structure of claim 1, the first leg of the one of the plurality of support members further comprising a window, wherein the friction member extends through the window.

4. The canopy structure of claim 1, wherein an area of the second leg of the one of the plurality of support members receiving the force is limited to the one connecting side of the second leg.

5. The canopy structure of claim 1, wherein the plurality of locking members is configured to lock the first leg and second leg of each of the plurality of support members at any adjustable height.

6. A canopy structure comprising:

at least one support member, the support member comprising a first leg and a second leg, the first leg and the second leg telescopically engaged with one another for movement along an adjustment axis to permit adjustment of a height of the support member, wherein the first leg and the second leg each have a generally trapezoidal cross-sectional shape having a long side, a short side and a pair of connecting sides extending between the long side and the short side;

an upper frame comprising at least one eave coupled to an upper end of the support member, the eave comprising at least one scissor-jack member and at least one sliding eave mount moveable along the adjustment axis between an extended position and a collapsed position;

a canopy cover supported by the upper frame; and a locking member movable between a locked position and an unlocked position, wherein a portion of the locking member is configured to apply a retaining force to a surface of one of the connecting sides of the one of the first leg and the second leg when the locking member is in the locked position to retain the first leg and the second leg in a fixed position relative to one another or to retain the sliding eave mount in a fixed position relative to one of the first leg and the second leg, wherein the retaining force is applied to the surface in a direction substantially perpendicular to the adjustment axis;

wherein the locking member includes a locking lever comprising a handle portion and a cam portion, wherein the locking lever is moveable to move the locking member between the unlocked position and the locked position, wherein the cam portion of the locking lever applies the retaining force to the one connecting side and wherein the handle portion of the locking lever extends across an entirety of the long side when the locking lever is in the locked position.

7. The canopy structure of claim 6, wherein the lock comprises a body that surrounds the support member.

8. The canopy structure of claim 7, wherein the locking member further comprises an engagement member that is separate from the body and the locking lever, wherein the engagement member is moved by the locking lever and contacts the one of the first leg and the second leg to apply the retaining force to the one of the first leg and the second leg.

9. The canopy structure of claim 8, wherein the other of the first leg and the second leg comprises a window, and wherein the engagement member extends through the window.

* * * * *